US008180923B2

(12) United States Patent (10) Patent No.: US 8,180,923 B2
Smith et al. (45) Date of Patent: May 15, 2012

(54) NETWORK ACCESS CONTROL FOR MANY-CORE SYSTEMS

(75) Inventors: Ned Smith, Beaverton, OR (US); Jesse Walker, Portland, OR (US); Kapil Sood, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 1098 days.

(21) Appl. No.: 11/290,408

(22) Filed: Nov. 29, 2005

(65) Prior Publication Data

US 2007/0124434 A1 May 31, 2007

(51) Int. Cl.
*G06F 15/16* (2006.01)
(52) U.S. Cl. ........................................................ 709/250
(58) Field of Classification Search .................. 709/250, 709/224, 238, 227, 201, 234, 246; 707/10, 707/E17.01, E17.032; 370/401, 524, 216, 370/396, 410, 468, 522, 420
See application file for complete search history.

(56) References Cited

U.S. PATENT DOCUMENTS

| | | | | |
|---|---|---|---|---|
| 6,779,065 B2 * | 8/2004 | Murty et al. | ................... | 710/260 |
| 7,403,525 B2 * | 7/2008 | Sano et al. | .................... | 370/392 |
| 7,451,459 B2 * | 11/2008 | Glass et al. | .................... | 719/328 |
| 7,490,203 B2 * | 2/2009 | Hsu et al. | ....................... | 711/147 |
| 7,506,170 B2 * | 3/2009 | Finnegan | ...................... | 713/182 |
| 2004/0226026 A1 * | 11/2004 | Glass et al. | .................... | 719/328 |
| 2005/0108709 A1 | 5/2005 | Sciandra et al. | | |
| 2005/0132364 A1 * | 6/2005 | Tewari et al. | ...................... | 718/1 |
| 2005/0132367 A1 * | 6/2005 | Tewari et al. | ...................... | 718/1 |
| 2005/0223005 A1 * | 10/2005 | Shultz et al. | ....................... | 707/8 |
| 2006/0184296 A1 * | 8/2006 | Voeller et al. | ................... | 701/33 |
| 2006/0190243 A1 * | 8/2006 | Barkai et al. | ....................... | 704/8 |

FOREIGN PATENT DOCUMENTS

JP      2002024048 A  *  1/2002
WO     WO 01/19031       3/2001

OTHER PUBLICATIONS

"Introducing Microsoft Virtual Server 2005 on IBM EServer Xseries Servers". Nov. 2004.*
Kenny Bain et al, "Introducing Microsoft Virtual Server 2005 on IBM server xSeries Servers", Nov. 2004, http://www.redbooks.ibm.com/redpapers/pdfs/redp3912.pdf.
Ed D. Durham et al, "The COPS (Common Open Policy Service) Protocol", IETF Standard, Internet Engineering Task Force, IETF, CH, Jan. 2000.
John Scott Robin et al., "Analysis of the Intel Pentium's Ability to Support a Secure Virtual Machine Monitor", Proceedings of the Usenix Security Symposium, Aug. 14, 2000.
PCT International Search Report and Written Opinion mailed May 29, 2007.

(Continued)

*Primary Examiner* — Jeffrey Pwu
*Assistant Examiner* — Saad A Waqas
(74) *Attorney, Agent, or Firm* — Blakely, Sokoloff, Taylor & Zafman LLP

(57) ABSTRACT

In a processor based system comprising a plurality of logical machines, selecting a logical machine of the system to serve as a host; the host communicating with a policy decision point (PDP) of a network to provision a data channel interconnecting the processor based system and the network and to provision a logical data channel interconnecting each logical machine of the system to the network.

15 Claims, 3 Drawing Sheets

OTHER PUBLICATIONS

PCT International Preliminary Report on Patentability mailed Jun. 12, 2008.
"Office Action for European Application No. 06-837 704.3-1525 dated Aug. 28, 2009", Whole Document.
"Office Action for Chinese Patent Application No. 200680044461. 2", Whole Document.
"Office Action for European Application No. 06-837 704.3-1525", Whole Document.

* cited by examiner

NETWORK ACCESS CONTROL FOR MANY-CORE SYSTEMS

BACKGROUND

A Network Access Control (NAC) system is used to enable the connection of a processor based system that is network enabled to a network such as, for example, a wireless network. In a typical scenario, a Policy Decision Point (PDP), usually a server on the network, establishes the identity and credentials of the system that is attempting to connect to the network before allowing its connection.

Many core systems are processor based systems in which multiple processors, multiple cores, or multiple virtualized processors are present. These may be used as portable computers such as laptop computers, personal digital assistants, or desktop computers, or servers, or another form of processor based system. In some many core systems, combinations of these types of platforms may be present. For example, a system may include a multicore processor, with each core having a separate address space, and furthermore having internal to that address space multiple virtualized machines.

As virtualized, multi-core, and hybrid systems become prevalent, it is likely that such systems will need to be admitted to a network by a NAC system.

DETAILED DESCRIPTION

Figure 1:
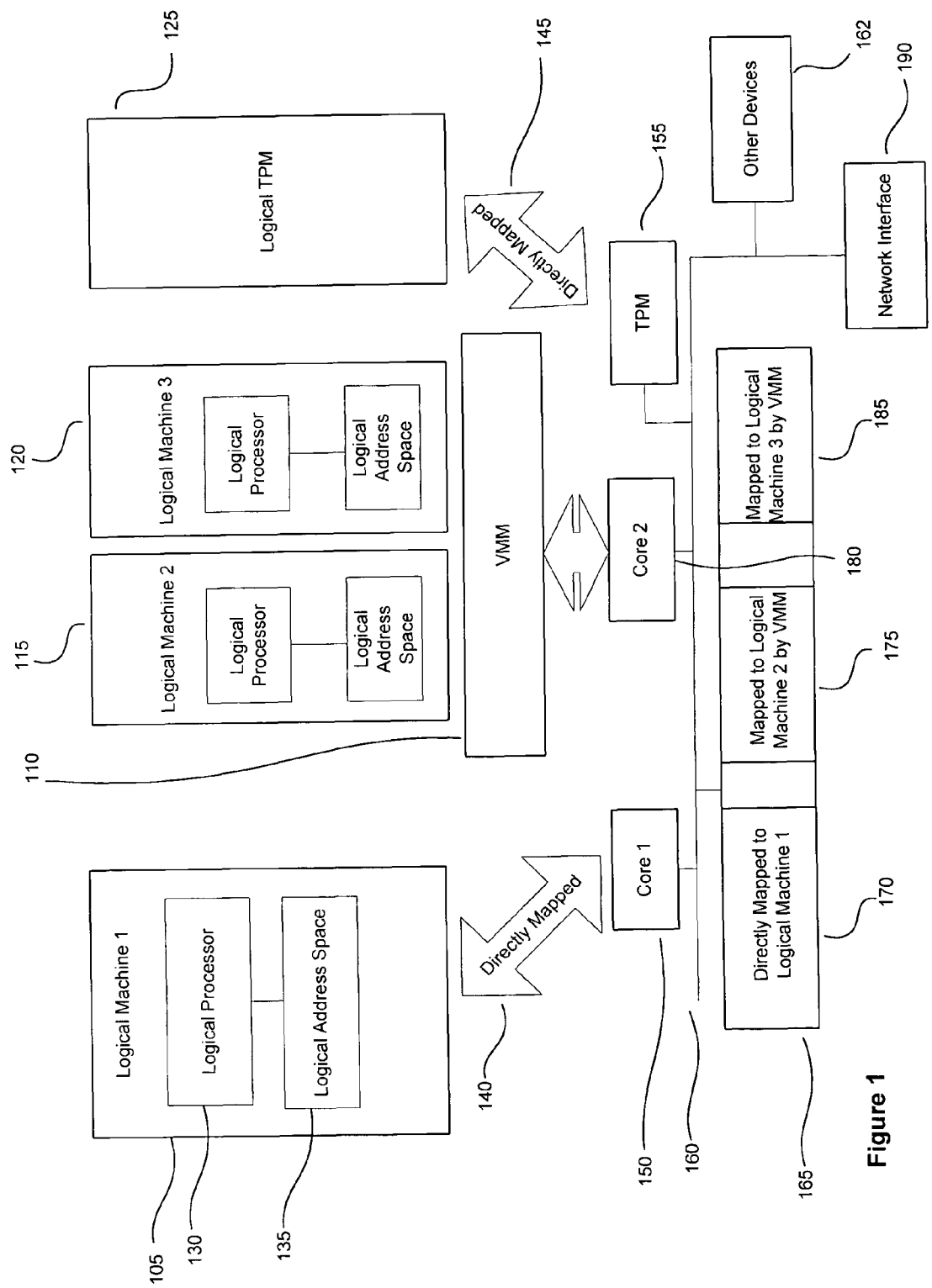
FIG. 1 depicts a high level view of a many core system in one embodiment.

A many core system is a term used herein to refer to a system such as that depicted in FIG. 1. As in the figure, a many core system may include a plurality of processor cores such as cores 150 and 180. The term core as used herein may refer, for example, to a single processor of a multiprocessor system, or to a processor core of a multicore processor. In general, the system has a set of busses such as the bus 160 that interconnects the cores and a memory 165 with devices on the bus such as a trusted platform module (TPM) 155, a network interface 190, and other devices 162. These devices may include for example, storage, input and output devices. As shown in the system depicted, the cores may form the basis of several logical machines presenting an abstraction of processor and memory, such as logical machines 1-3, at 105, 115, and 120. Each logical machine provides a logical view of a processor 130 and memory 135 to programs executing on the logical machine. In some instances such as with logical machine 1 at 105, a core such as the core 150 and a segment of the system memory 170 may be directly mapped 140 to the logical machine 105 much as in a single processor system. In other instances, logical machines may actually be virtual machines such as the machines 115 and 120, that may in turn execute via a virtual machine monitor (VMM) that itself executes directly on a core such as the core at 180. The VMM may then partition the memory available to its core 180 into segments 175 and 185 allocated to the virtual logical machines 115 and 120 respectively. General purpose logical machines of a many core system such as 105, 115 and 120 may also be referred to as (logical) address spaces of the system, because each logical machine defines an address space within which a logical memory and a register set of a processor may be referenced. Special purpose logical machines may also be provided, for example the trusted platform module (TPM) of the many core system 125 may be provided as a logical TPM by directly mapping 145 a hardware TPM 155. Similarly, other devices including I/O devices, may be provided as logical devices. In other instances, services associated with a TPM may be provided as a logical machine supported in hardware by a general purpose core.

A many core system may connect to a network with a network interface device 190 such as a wireless network adapter or a wired network adapter as is known. In many cases, the logical machines of the system may map their internal logical representations of the adapter to the same network interface 190. Thus, when a many core system such as the one depicted in FIG. 1 connects to a network, the interface 190 is shared by multiple logical machines.

As should be evident to the artisan, a practically unlimited set of variations of the many core system depicted in the figure is possible. In particular, the number of cores, and the mapping from cores to logical machines may be varied; in some embodiment systems, there may be no virtual machines present, while in others all the logical machines may be virtual. A TPM may not be present in some systems, while multiple TPMs may be provided in others. A system may participate in multiple networks with multiple network interfaces in some embodiments. Many other variations are possible.

Figure 2:
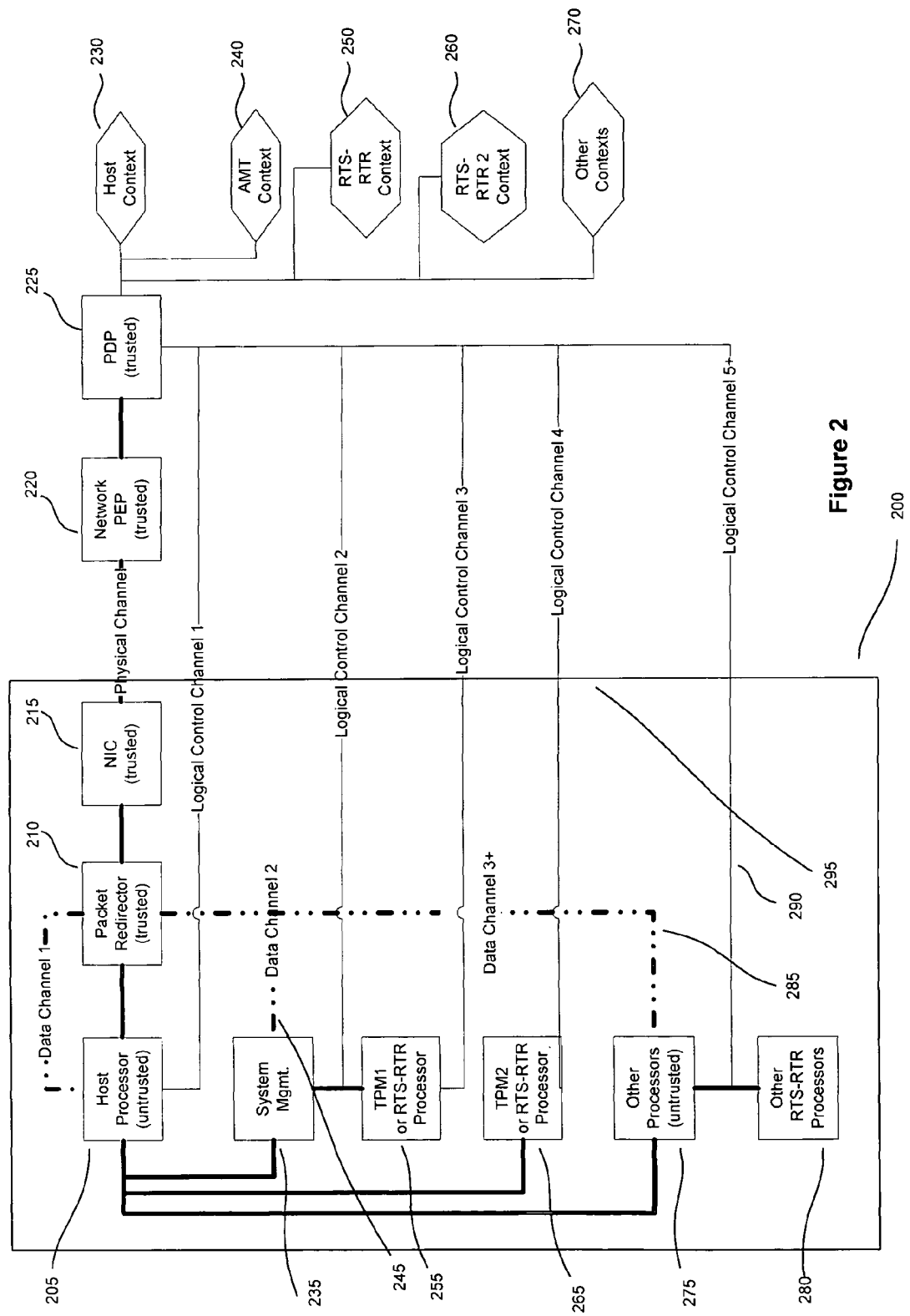
FIG. 2 depicts a many core system in a Network Access Control environment.

In FIG. 2, an embodiment in which a many core system 200 is connected to a network with Network Access Control (NAC) is depicted. The system 200 may include several logical machines or logical address spaces as explained previously. In this example, the system includes logical machines that are trusted platform modules (TPMs) which may serve as roots of trust for storage and reporting (RTS-RTR), 255 and 265, a machine for system management (235), and other machines 275 and 280. As before, these machines may themselves be implemented directly on hardware cores of system 200, or as virtual machines that run on a virtual machine monitor. In some embodiments a dedicated machine, packet redirector 210 may be used to redirect data packets within the system at the data link level. Internal data links 245 such as data channel 1, data channel 2, and data channel 3 interconnect the logical machines of the system internally.

The depicted system connects to a network using an interface 215 over a physical channel which may be a wired, optical, radio frequency or other datalink as is known in the art. The policy enforcement point (PEP) 220 is the entry point of the network and enforces network access control policy as determined by the PDP 225 such as a Radius server. The PEP routes the connection request in this embodiment to the PDP, which may provision a data channel between system 200 and the network. The PDP in this embodiment may also provide a context for each of the logical machines of the system to interact with the network on a logical data channel with its own identity and security credentials.

In order to provision this data channel and the logical channels to the logical machines of system 200, in this embodiment, an internal process such as random selection is used within the system 200 to select one of the logical machines of the system 205 to act as a host machine. The host machine does not have to be a trusted processor either from the point of view of the PDP or from the point of view of the other machines of the system, but serves as a relaying intermediary between the network and the system 200. Once a host machine is selected, a negotiation between the logical machines of system 200 and the PDP sets up logical control channels such as 290 and 295 to provision the logical data channels between the network and the logical machines of the system.

The host machine has the added responsibility of preventing man-in-the-middle redirection of messages provided by the other machines and tunneled through the host's connection. At least one technique for preventing such redirection is to generate a hash of all the messages provided by the other cores in a hash that is then used to establish session keys for the host tunnel. Protection of the "inner" logical machines from host tampering may be performed by each machine negotiating session keys directly with the PDP. The session keys may be used to protect provisioning messages from tampering by the untrusted host machine.

Once the PDP is sufficiently satisfied regarding authentication/status of the inner machines and host machine, the host generates a pre-master key (PMK) derived from the hash of "inner" messages as described above and supplies it to the Network Interface (NIC) where session keys for the data channel may be generated (e.g. using a 4-way key exchange or similar protocol). Along with the "inner" method material, the PMK key derivation may also include the identity of the many core system. Once the PMK key (and, other keys, including for example, session keys) are derived, they will be securely stored in a TPM which is accessible to all machines of the many core system. Each machine presents appropriate credentials to retrieve, update, and delete these session keys and other security associations.

Figure 3:
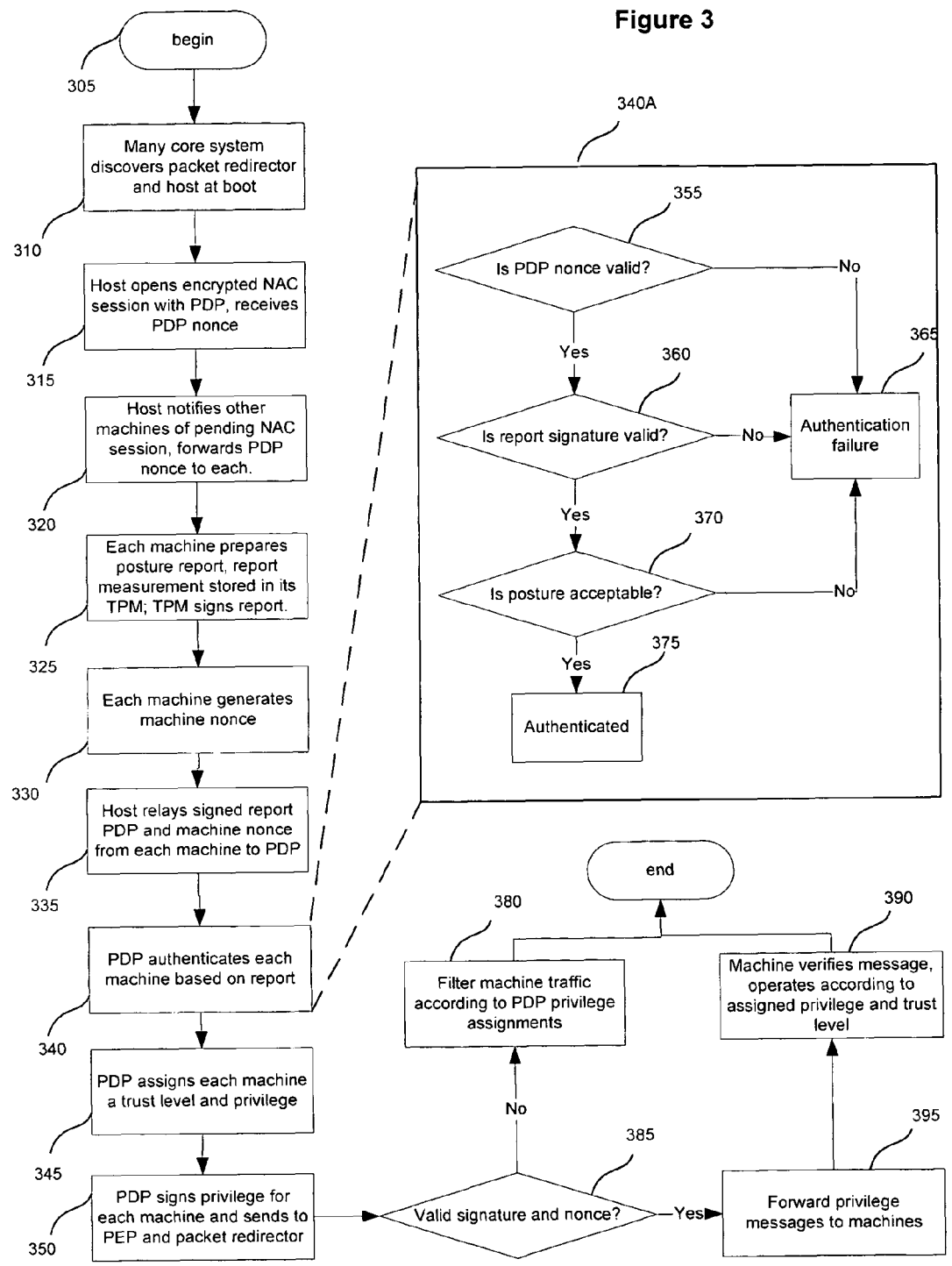
FIG. 3 depicts the flow of processing in one embodiment.

FIG. 3 represents the flow of processing in one embodiment when a many core system boots and connects to a NAC network. At boot, the system internally determines a machine to serve as host and a machine to serve as packet redirector, 310. In one embodiment, the host machine may be selected at random. The machine selected to serve as host opens an encrypted NAC session with the PDP of the network, using the PMK and receiving a nonce from the PDP that will be used for the rest of the session, 315. The host then notifies all the remaining machines in the many core system that a NAC session is pending, and forwards the nonce from the PDP to each machine, 320. Each machine then prepares a posture report which indicates its status for a PDP determination of its access privileges. This report is signed by a TPM for the machine and a measurement of the report may be stored in the TPM. The machine also generates its own nonce at 330. The signed reports and both the PDP and machine nonces from the machines are then relayed to the PDP by the host at 335. On receiving each report and nonces, the PDP authenticates it at 340. Details of the authentication process are depicted in block 340A.

As depicted in block 340A, to authenticate a machine from the many core system, the PDP first verifies its own nonce returned with the report at 355. It then checks that the report signature is valid at 360. Finally, it determines if the machine's posture is acceptable, at 370. If all three of these conditions are met, the PDP authenticates that machine, otherwise, authentication fails.

After authentication is complete, at 345, the PDP assigns each machine a trust level and a privilege using a session key for encryption. The final assignment is then forwarded to the packet redirector and policy enforcement point (PEP) for enforcement. Once the signature and nonce with the assignment are validated, 385, each machine may operate according to its assigned privilege and trust level, 395. If validation fails at this stage for a machine, the PEP and packet redirector operate according to default privilege assignments for an unprivileged machine, 380.

As should be understood by one in the art, the above embodiment represents only one processing flow by which a many core system may be authenticated to a NAC network. In some embodiments, not all machines in the many core network may need network access. In others, some of the processing steps may be omitted; and others added, for example, all machines in the many core system may use a single posture. The various names and acronyms used are for ease of exposition, in general many other terms may be used. For example, a PDP may be referred to as an RAS-AAA server; a PEP may be termed a gateway or firewall, and similarly each machine in the many core system may have a specific term. As before, the machines may themselves be physically segregated cores and address spaces or may be virtual machines. Not all embodiments may have virtual machines or multicore processors. Many other variations are possible.

The packet redirector in some embodiments may also be responsible for directing packets between the different logical machines of the many core system. In some embodiments, an a-priori set of filtering rules may control the operation of the packet redirector; in others, the packet redirector may be configured by the PDP. In a stand alone mode, a many core system may also in some instances serve as a multi-layer secure system with the packet redirector serving as a security kernel for cores operating at different privileges or trust levels.

In the preceding description, for purposes of explanation, numerous specific details are set forth in order to provide a thorough understanding of the described embodiments, however, one skilled in the art will appreciate that many other embodiments may be practiced without these specific details.

Some portions of the detailed description above are presented in terms of algorithms and symbolic representations of operations on data bits within a processor-based system. These algorithmic descriptions and representations are the means used by those skilled in the art to most effectively convey the substance of their work to others in the art. The operations are those requiring physical manipulations of physical quantities. These quantities may take the form of electrical, magnetic, optical or other physical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the description, terms such as "executing" or "processing" or "computing" or "calculating" or "determining" or the like, may refer to the action and processes of a processor-based system, or similar electronic computing device, that manipulates and transforms data represented as physical quantities within the processor-based system's storage into other data similarly represented or other such information storage, transmission or display devices.

In the description of the embodiments, reference may be made to accompanying drawings. In the drawings, like numerals describe substantially similar components throughout the several views. Other embodiments may be utilized and structural, logical, and electrical changes may be made. Moreover, it is to be understood that the various embodiments, although different, are not necessarily mutually exclusive. For example, a particular feature, structure, or characteristic described in one embodiment may be included within other embodiments.

Further, a design of an embodiment that is implemented in a processor may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, data representing a hardware model may be the data specifying the presence or absence of various features on different mask layers for masks used to produce the integrated circuit. In any representation of the design, the data may be stored in any form of a machine-readable medium. An optical or electrical wave modulated or otherwise generated to transmit such information, a memory, or a magnetic or optical storage such as a disc may be the machine readable medium. Any of these mediums may "carry" or "indicate" the design or software information. When an electrical carrier wave indicating or carrying the code or design is transmitted, to the extent that copying, buffering, or re-transmission of the electrical signal is performed, a new copy is made. Thus, a communication provider or a network provider may make copies of an article (a carrier wave) that constitute or represent an embodiment.

Embodiments may be provided as a program product that may include a machine-readable medium having stored thereon data which when accessed by a machine may cause the machine to perform a process according to the claimed subject matter. The machine-readable medium may include, but is not limited to, floppy diskettes, optical disks, DVD-ROM disks, DVD-RAM disks, DVD-RW disks, DVD+RW disks, CD-R disks, CD-RW disks, CD-ROM disks, and magneto-optical disks, ROMs, RAMs, EPROMs, EEPROMs, magnet or optical cards, flash memory, or other type of media/machine-readable medium suitable for storing electronic instructions. Moreover, embodiments may also be downloaded as a program product, wherein the program may be transferred from a remote data source to a requesting device by way of data signals embodied in a carrier wave or other propagation medium via a communication link (e.g., a modem or network connection).

Many of the methods are described in their most basic form but steps can be added to or deleted from any of the methods and information can be added or subtracted from any of the described messages without departing from the basic scope of the claimed subject matter. It will be apparent to those skilled in the art that many further modifications and adaptations can be made. The particular embodiments are not provided to limit the claimed subject matter but to illustrate it. The scope of the claimed subject matter is not to be determined by the specific examples provided above but only by the claims below.

What is claimed is:

1. In a computer hardware platform, a method comprising:
selecting from a plurality of logical machines of the computer hardware platform a logical machine to serve as a host for the other logical machines of the plurality of logical machines, each of the plurality of logical machines corresponding to a different respective mapping of a plurality of mappings, wherein each of the plurality of mappings maps the corresponding logical machine to a different respective physical processor, wherein for each of the plurality of logical machines, a program executing on the logical machine is presented by the logical machine with a logical view of a processor and a memory, wherein a policy enforcement point (PEP) provides an entry point for the computer hardware platform to connect to a network, wherein the PEP enforces a network access control policy of a policy decision point (PDP) before allowing the computer hardware platform to connect to the network;
prior to the PDP allowing any connection of the computer hardware platform to the network, the host sending a message via a network interface of the computer hardware platform to the PEP, the message requesting that the PDP establish a data channel interconnecting the computer hardware platform and the network; and
establishing the requested data channel, including:
the host authenticating itself to the PDP;
the host generating a cryptographic key based on a hash of a combination of messages received by the host, the combination including messages from each of the other logical machines of the plurality of logical machines; and
the host negotiating the cryptographic key with the PDP to provision the data channel:
wherein the host operates as a relaying intermediary for the plurality of logical machines, including the host forwarding messages between the PDP and the other logical machines, and wherein the data channel includes a different respective logical data channel for each of the plurality of logical machines, each logical channel interconnecting the respective logical machine of the logical channel to the network.

2. The method of claim 1 wherein one of the plurality of logical machines comprises a core of a multi-core processor and a corresponding address space.

3. The method of claim 1 wherein one of the plurality of logical machines comprises a virtual machine and a corresponding address space.

4. The method of claim 1, further comprising:
creating a different respective logical control channel between the PDP and each logical machine of the computer hardware platform; and
wherein establishing the requested data channel includes the host opening a Network Access Control (NAC) session with the PDP, the host notifying each of the other logical machines of the plurality of logical machines that the NAC session is open, and, in response to the notifying, each of the other logical machines of the plurality of logical machines sending to the host a respective report indicating a status of the logical machine, each sending of a report for determination of access privileges.

5. The method of claim 4 wherein creating the different respective logical control channel between the PDP and each logical machine of the computer hardware platform includes:
each logical machine establishing an identity to the PDP;
each logical machine providing a set of security credentials to the PDP;
each logical machine reporting integrity status to the PDP;
receiving from the PDP rules for each logical machine over the control channel; and
wherein the PDP creates a different respective security context for each logical machine of the computer hardware platform.

6. The method of claim 1 further comprising at least one of:
dynamically selecting a logical machine of the computer hardware platform to serve as a trusted platform module (TPM); and
dynamically selecting a logical machine of the computer hardware platform to serve as a packet redirector.

7. A computer hardware platform comprising:
a plurality of logical machines, each of the plurality of logical machines to present to a program executing on the logical machine a logical view of a processor and a memory, each of the plurality of logical machines corresponding to a different respective mapping of a plurality of mappings, wherein each of the plurality of mappings maps the corresponding logical machine to a different respective physical processor core, the plurality of machines including a first logical machine to operate as a host for the other logical machines of the plurality of logical machines, wherein a policy enforcement point (PEP) provides an entry point for the computer hardware platform to connect to a network, wherein the PEP enforces a network access control policy of a policy decision point (PDP) before allowing the computer hardware platform to connect to the network, the host to issue, prior to the PDP allowing any connection of the computer hardware platform to the network, a request that the PDP establish a data channel interconnecting the computer hardware platform and the network, the host further to establish the data channel with the PDP of the network, including:
the host to authenticate itself to the PDP;
the host to generate a cryptographic key based on a hash of a combination of messages received by the host, the combination including messages from each of the other logical machines of the plurality of logical machines; and
the host to negotiate the cryptographic key with the PDP to provision the data channel;
wherein the host operates as a relaying intermediary for the plurality of logical machines, including the host to forward messages between the PDP and the other logical machines, wherein the data channel includes a different respective logical data channel for each of the plurality of logical machines, each logical data channel interconnecting the respective logical machine of the logical channel to the network; and
a network interface to send the request of the host to the PEP of the network.

8. The computer hardware platform of claim 7 wherein one of the plurality of machines further comprises a core of a multi-core processor and a corresponding address space.

9. The computer hardware platform of claim 7 wherein one of the plurality of machines further comprises a virtual machine and a corresponding address space.

10. A machine readable medium having stored thereon data that when accessed by a machine causes the machine to perform a method, the method comprising:
in a computer hardware platform, selecting from a plurality of logical machines of the computer hardware platform a logical machine to serve as a host for the other logical machines of the plurality of logical machines, each of the plurality of logical machines corresponding to a different respective mapping of a plurality of mappings, wherein each of the plurality of mappings maps the corresponding logical machine to a different respective physical processor, wherein for each of the plurality of logical machines, a program executing on the logical machine is presented by the logical machine with a logical view of a processor and a memory, wherein a policy enforcement point (PEP) provides an entry point for the computer hardware platform to connect to a network, wherein the PEP enforces a network access control policy of a policy decision point (PDP) before allowing the computer hardware platform to connect to the network;
prior to the PDP allowing any connection of the computer hardware platform to the network, the host sending a message via a network interface of the computer hardware platform to the PEP, the message requesting that the PDP establish a data channel interconnecting the computer hardware platform and the network; and
establishing the requested data channel, including:
the host authenticating itself to the PDP;
the host generating a cryptographic key based on a hash of a combination of messages received by the host, the combination including messages from each of the other logical machines of the plurality of logical machines; and
the host negotiating the cryptographic key with the PDP to provision the data channel;
wherein the host operates as a relaying intermediary for the plurality of logical machines, including the host forwarding messages between the PDP and the other logical machines, and wherein the data channel includes a different respective logical data channel for each of the plurality of logical machines, each logical channel interconnecting the respective logical machine of the logical channel to the network.

11. The machine readable medium of claim 10 wherein the computer hardware platform comprises a logical machine further comprising a core of a multi-core processor and a corresponding address space.

12. The machine readable medium of claim 10 wherein the computer hardware platform comprises a logical machine further comprising a virtual machine and a corresponding address space.

13. The machine readable medium of claim 10, wherein the method further comprises creating a different respective logical control channel between the PDP and each logical machine of the computer hardware platform.

14. The machine readable medium of claim 13 wherein creating the different respective logical control channel between the PDP and each logical machine comprises:
each logical machine establishing an identity to the PDP;
each logical machine providing a set of security credentials to the PDP;
each logical machine reporting integrity status to the PDP;
receiving from the PDP rules for each logical machine over the control channel; and
wherein the PDP creates a different respective security context for each logical machine of the computer hardware platform.

15. The machine readable medium of claim 10 wherein the method further comprises at least one of:
dynamically selecting the logical machine of the computer hardware platform to serve as the host;
dynamically selecting a logical machine of the computer hardware platform to serve as a trusted platform module (TPM); and
dynamically selecting a logical machine of the system to serve as a packet redirector.

* * * * *